United States Patent
Berels et al.

(10) Patent No.: US 10,611,234 B1
(45) Date of Patent: Apr. 7, 2020

(54) BATTERY ASSEMBLY WITH SUPPORTIVE THERMAL EXCHANGE DEVICE AND THERMAL MANAGEMENT METHOD USING SAME

(71) Applicant: Ford Global Technologies, LLC, Dearborn, MI (US)

(72) Inventors: David Jeffeory Berels, Plymouth, MI (US); John Wayne Jaranson, Dearborn, MI (US); Anthony Ligi, Jr., Chelsea, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/269,118

(22) Filed: Feb. 6, 2019

(51) Int. Cl.
| | |
|---|---|
| *B60K 11/06* | (2006.01) |
| *B60K 1/04* | (2019.01) |
| *B60L 58/26* | (2019.01) |
| *B60L 50/60* | (2019.01) |
| *H01M 10/625* | (2014.01) |
| *H01M 10/656* | (2014.01) |
| *H01M 10/6556* | (2014.01) |
| *H01M 10/613* | (2014.01) |
| *H01M 2/10* | (2006.01) |

(52) U.S. Cl.
CPC ............... *B60K 11/06* (2013.01); *B60K 1/04* (2013.01); *B60L 50/66* (2019.02); *B60L 58/26* (2019.02); *H01M 10/613* (2015.04); *H01M 10/625* (2015.04); *H01M 10/656* (2015.04); *H01M 10/6556* (2015.04); *B60K 2001/0438* (2013.01); *H01M 2/1077* (2013.01)

(58) Field of Classification Search
CPC ..................................................... B60K 11/06
See application file for complete search history.

(56) References Cited

U.S. PATENT DOCUMENTS

| | | | |
|---|---|---|---|
| 6,396,694 B1 | 5/2002 | van den Berg | |
| 9,437,852 B2 * | 9/2016 | Fees .................... | H01M 10/625 |
| 9,440,555 B2 | 9/2016 | Garfinkel et al. | |
| 2011/0317369 A1 | 12/2011 | Pautsch et al. | |
| 2012/0315528 A1 | 12/2012 | Rajaie et al. | |

(Continued)

OTHER PUBLICATIONS

Wakefield-vette—Liquid Cooling—Liquid Cold Plates—retrieved from http://www.wakefield-vette.com/products/liquid-cooling/liquid-cold-plates.aspx.

*Primary Examiner* — John D Walters
*Assistant Examiner* — James J Triggs
(74) *Attorney, Agent, or Firm* — David Kelley; Carlson, Gaskey & Olds, P.C.

(57) ABSTRACT

An example battery assembly includes, among other things, at least one thermal exchange device. Each thermal exchange device has a plurality of liquid coolant channels, a first side that supports at least one battery array, and a second side. A plurality of fins extend from the second side. A skid plate is adjacent the plurality of fins to establish a plurality of air coolant channels between the second side and the skid plate. An example thermal management method includes moving air through a plurality of air coolant channels established between a skid plate and at least one thermal exchange device. The thermal exchange device supports at least one battery array. The thermal exchange device includes a plurality of liquid coolant channels that communicate a liquid coolant to exchange thermal energy with the at least one battery array.

20 Claims, 4 Drawing Sheets

(56) References Cited

U.S. PATENT DOCUMENTS

| | | |
|---|---|---|
| 2013/0192807 A1 | 8/2013 | DeKeuster |
| 2015/0125722 A1* | 5/2015 | Fees .................... H01M 10/625 429/72 |
| 2015/0144314 A1 | 5/2015 | Srinivassan et al. |
| 2015/0291019 A1 | 10/2015 | Hatta et al. |
| 2016/0029515 A1 | 1/2016 | Tansley |
| 2017/0025721 A1 | 1/2017 | Moschet et al. |

* cited by examiner

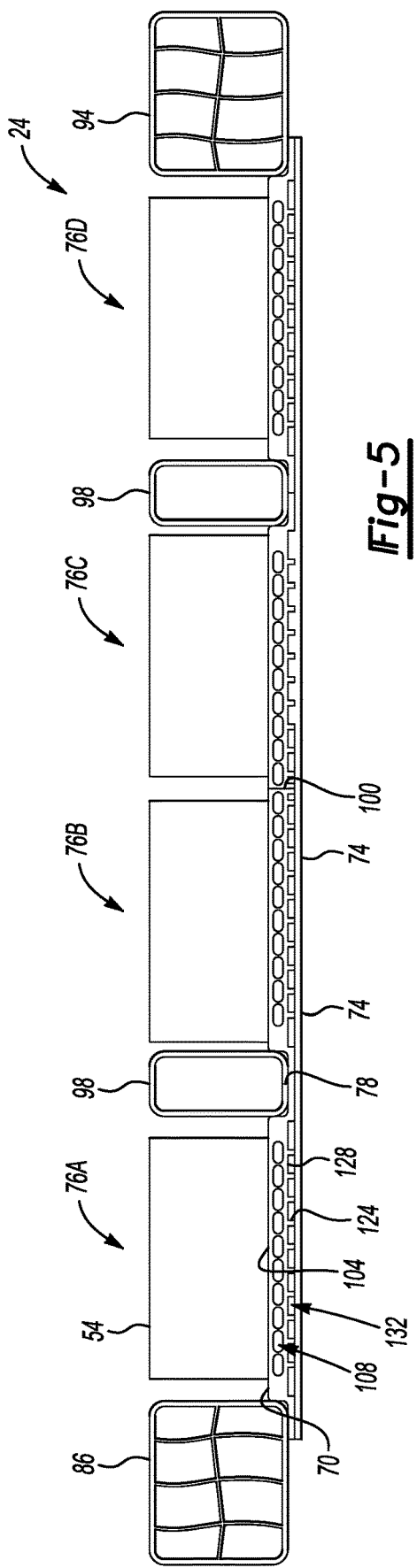
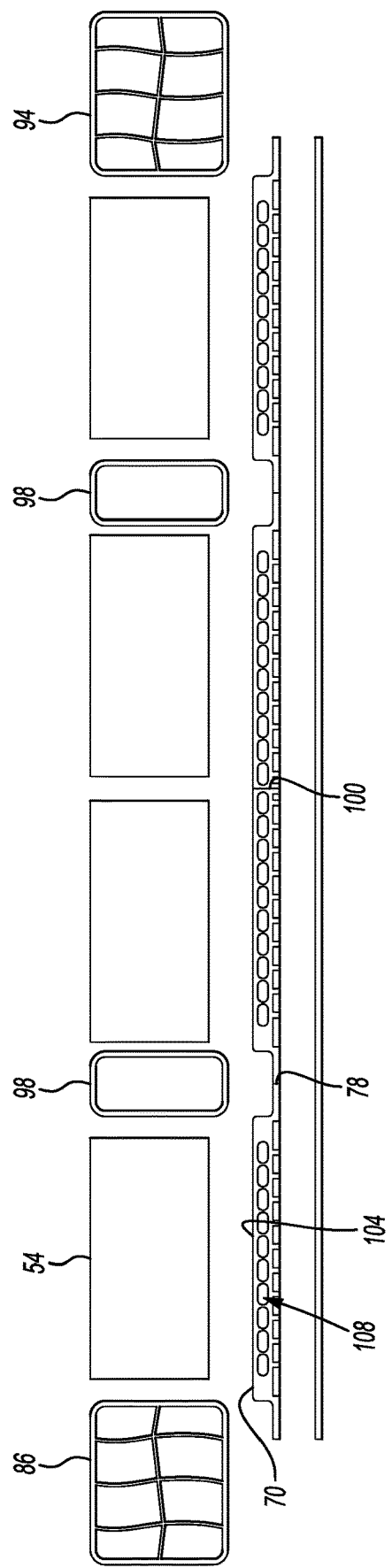

BATTERY ASSEMBLY WITH SUPPORTIVE THERMAL EXCHANGE DEVICE AND THERMAL MANAGEMENT METHOD USING SAME

TECHNICAL FIELD

This disclosure relates generally to a traction battery pack and, more particularly, to structurally supporting battery arrays of the traction battery pack using at least one thermal exchange device.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction battery is a relatively high-voltage battery that selectively powers the electric machines and, potentially, other electrical loads of the electrified vehicle. The traction battery can include battery arrays each including a plurality of interconnected battery cells that store energy. The battery arrays can require thermal management and support within the electrified vehicle.

SUMMARY

A battery assembly according to an exemplary aspect of the present disclosure includes, among other things, at least one thermal exchange device. Each thermal exchange device has a plurality of liquid coolant channels, a first side that supports at least one battery array, and a second side. A plurality of fins extend from the second side. A skid plate is adjacent the plurality of fins to establish a plurality of air coolant channels between the second side and the skid plate.

In a further embodiment of the foregoing assembly, the thermal exchange device is secured adjacent to an underside of an electrified vehicle.

In a further embodiment of any of the foregoing assemblies, the thermal exchange device provides a thermal exchange device assembly spanning from a driver side frame rail of a vehicle to a passenger side frame rail of the vehicle.

In a further embodiment of any of the foregoing assemblies, the plurality of liquid coolant channels are configured to communicate a liquid coolant that exchanges thermal energy with the battery array.

A further embodiment of any of the foregoing assemblies includes a fan configured to selectively move a flow of air through the air coolant channels.

In a further embodiment of any of the foregoing assemblies, the first side is vertically above the second side.

In a further embodiment of any of the foregoing assemblies, the plurality of liquid coolant channels are between the first and second sides.

In a further embodiment of any of the foregoing assemblies, the battery array is a constituent of a traction battery pack.

In a further embodiment of any of the foregoing assemblies, the plurality of fins and the thermal exchange device are formed together as a monolithic structure.

In a further embodiment of any of the foregoing assemblies, the skid plate is a polymer-based material.

In a further embodiment of any of the foregoing assemblies, a first thermal exchange device has a lateral side portion secured directly to a lateral side portion of a second thermal exchange device.

In a further embodiment of any of the foregoing assemblies, the first side is opposite the second side.

A thermal management method according to another exemplary aspect of the present disclosure includes moving air through a plurality of air coolant channels established between a skid plate and at least one thermal exchange device. The thermal exchange device supports at least one battery array. The thermal exchange device includes a plurality of liquid coolant channels that communicate a liquid coolant to exchange thermal energy with at least one battery array.

A further embodiment of the foregoing method includes supporting the at least one battery array on a first side of the thermal exchange device, and a placing the skid plate against a plurality of fins extending from an opposite, second side of the thermal exchange device.

A further embodiment of any of the foregoing methods includes securing the thermal exchange device adjacent to an underside of an electrified vehicle.

In a further embodiment of any of the foregoing methods, at least one thermal exchange device spans from a driver side frame rail of a vehicle to a passenger side frame rail of the vehicle.

A further embodiment of any of the foregoing methods includes moving air through the plurality of air coolant channels using a fan when charging the battery array from an external power source.

A further embodiment of any of the foregoing methods includes using the liquid coolant within the plurality of liquid coolant channels to cool the battery array, and using air within the plurality of air coolant channels to cool the liquid coolant within the plurality of liquid coolant channels.

A further embodiment of any of the foregoing methods includes conveying thermal energy through the thermal exchange device from the battery array to both the liquid coolant within the liquid coolant channels and to air within the air coolant channels.

In a further embodiment of any of the foregoing methods, the skid plate is vertically beneath both the battery array and the thermal exchange device.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 5 shows a section view taken at line 5-5 in FIG. 3.

FIG. 6 shows a partially expanded view of the section in FIG. 5.

DETAILED DESCRIPTION

This disclosure relates generally to using one or more thermal exchange devices to support a battery array within a traction battery pack.

Prior art battery arrays are often housed within an enclosure having an enclosure tray and an enclosure lid. The prior art battery arrays can be placed on a cold plate within the enclosure. In the prior art, the battery arrays and the cold plate are supported by the enclosure tray, which is not used to actively manage thermal energy.

Supporting the battery arrays with thermal exchange devices rather than an enclosure tray can simplify the traction battery pack by providing support to the battery arrays without requiring a supportive tray structure separate from the thermal exchange devices.

As required, a liquid coolant can be moved through liquid coolant channels within the thermal exchange devices to exchange thermal energy with the battery arrays. Further, air can move through air coolant channels to exchange thermal energy with the liquid coolant, thermal exchange devices, the battery arrays, or some combination of these.

Figure 1:
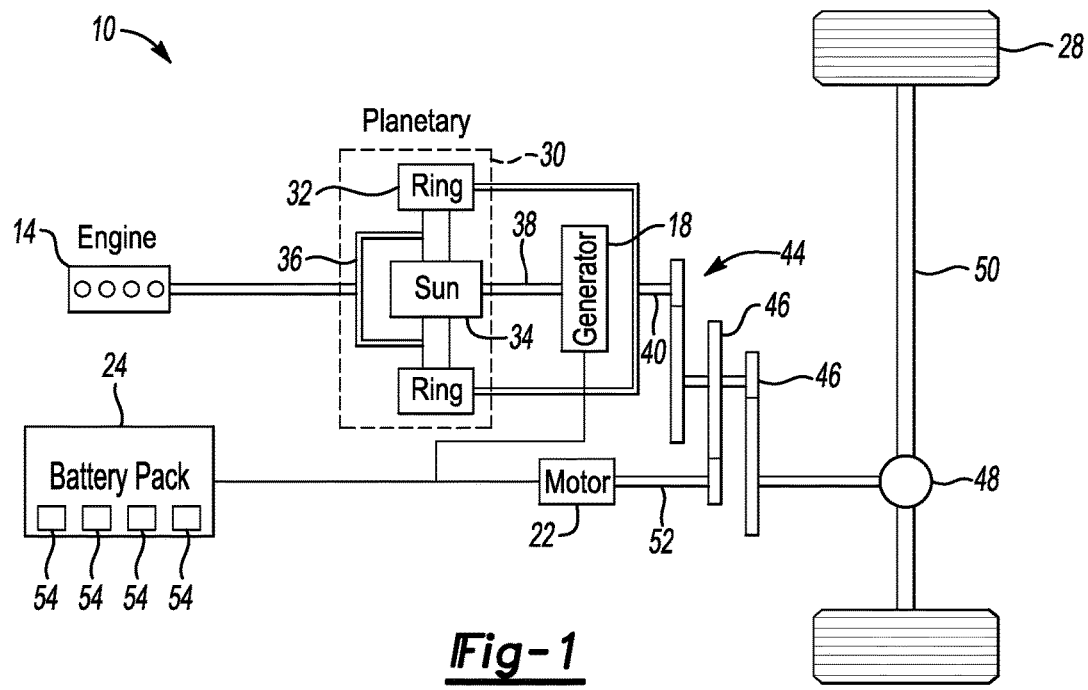
FIG. 1 schematically shows a powertrain of an example electrified vehicle.

FIG. 1 schematically illustrates a powertrain 10 for an electrified vehicle. Although depicted as a hybrid electrified vehicle (HEV), it should be understood that the concepts described herein are not limited to HEVs and could extend to other electrified vehicles, including, but not limited to, plug-in hybrid electrified vehicles (PHEVs), fuel cell vehicles (FCVs), and battery electrified vehicles (BEVs).

In one embodiment, the powertrain 10 is a powersplit powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle.

The engine 14, which is an internal combustion engine in this example, and the generator 18 may be connected through a power transfer unit 30. In one non-limiting embodiment, the power transfer unit 30 is a planetary gear set that includes a ring gear 32, a sun gear 34, and a carrier assembly 36. Of course, other types of power transfer units, including other gear sets and transmissions, may be used to connect the engine 14 to the generator 18.

The generator 18 can be driven by engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 (i.e., the second electric machine) can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an example type of electrified vehicle battery assembly. The battery pack 24 may have the form of a high-voltage battery that is capable of outputting electrical power to operate the motor 22 and the generator 18. Other types of energy storage devices and/or output devices can also be used with the electrified vehicle having the powertrain 10. The battery pack 24 is a traction battery pack as the battery pack 24 can provides power to drive the vehicle drive wheels 28. The battery pack 24 includes a plurality of battery arrays 54 each including a plurality of individual battery cells.

With reference now to FIGS. 2-6, the battery pack 24 can be secured adjacent to an underside 58 of an electrified vehicle 62. The battery pack 24, according to an exemplary aspect of the present disclosure, includes, in addition to the battery arrays 54, a frame structure 66, one or more thermal exchange devices 70, and a skid plate 74.

The battery arrays 54 are each positioned horizontally between portions of the frame structure 66. The battery arrays 54 are each supported vertically on one of the thermal exchange devices 70. In other examples, one or more of the battery arrays 54 could be supported vertically on more than one of the thermal exchange devices 70.

Vertical and horizontal, for purposes of this disclosure, are with reference to the ground or horizon and an ordinary orientation of the electrified vehicle 62 during operation.

In the exemplary embodiment, the thermal exchange devices 70 are mounted along a vertical bottom portion of the frame structure 66. When installed within the electrified vehicle 62, the underside 58 of the electrified vehicle 62 covers the vertical top surfaces of the battery arrays 54. Thus, when installed within the electrified vehicle 62, the battery arrays 54 are enclosed by the thermal exchange devices 70, the frame structure 66, and the underside 58.

In the past, battery arrays, cooling heat exchangers, and supporting electronics were all supported within a separate enclosure. In exemplary embodiments of this disclosure, the frame structure 66 and the thermal exchange devices 70 support the battery arrays 54 without requiring at least an added enclosure tray. Instead, the frame structure 66 can be used in place of enclosure tray walls, and the thermal exchange device 70 in place of an enclosure tray floor Eliminating the enclosure and supporting the battery arrays 54 with the thermal exchange devices and frame structure 66 can save, in some examples, from 5 to 20 kilograms.

The skid plate 74 is placed against an underside of the thermal exchange devices 70. The skid plate 74 is vertically beneath both the battery arrays 54 and the thermal exchange devices 70.

The skid plate 74 can protect the thermal exchange device 70 from road debris, for example. The skid plate 74 can instead, or additionally, provide a thermal barrier for the thermal exchange device 70. For example, the skid plate 74 can block the heat from a hot surface of a parking lot from radiating upward and heating the thermal exchange device 70.

The skid plate 74 is, in this exemplary embodiment, a polymer-based material that is relatively lightweight when compared to the thermal exchange device 70. The exemplary skid plate 74 is not a structural support for the battery arrays 54. That is, the battery arrays 54 are suitably supported within the electrified vehicle 62 with or without the skid plate 74.

The battery pack 24, in the exemplary embodiment, includes four rows 76A-76D of battery arrays 54. The rows 76A-76D extend in a direction aligned with a longitudinal axis A of the electrified vehicle 62. The rows 76A and 76D are outer rows relative to the rows 76B and 76C.

Each of the example rows 76A-76D includes four of the battery arrays 54. Each of the battery arrays 54 then includes the plurality of individual battery cells, say, for example, twenty-four individual battery cells. In other examples, other number of rows, and battery arrays within those rows, could be used.

The exemplary embodiment includes four thermal exchange devices 70 arranged side-by-side. Each row 76A-76D of battery arrays 54 is supported on one of the thermal exchange devices 70.

Laterally inboard portions of the thermal exchange devices 70 supporting the outer rows 76A and 76D are each secured at an interface 78 to one of the thermal exchange devices 70 supporting the inner rows 76C and 76D. The laterally outboard portion of the thermal exchange device 70 supporting the outer row 76A on a passenger side 82 of the electrified vehicle 62 is secured to a passenger side frame rail 86 of the frame structure 66. The laterally outboard portion of the thermal exchange device 70 supporting the outer row 76D on a driver side 90 of the electrified vehicle 62 is secured to a driver side frame rail 94 of the frame structure 66.

The laterally inboard portions of the thermal exchange devices 70 supporting the laterally outer rows 76A and 76D are secured to a respective inner rail 98 of the frame structure 66. The laterally outboard portions of the thermal exchange devices 70 supporting the laterally inner rows 76B and 76C are also secured to the respective inner rail 98 of the frame structure 66. Further, the laterally inboard portions of the thermal exchange devices 70 supporting the inner rows 76B and 76C are secured together at an interface 100.

During assembly, the thermal exchange devices 70 can be secured together at the interfaces 78 and 100 to provide a thermal exchange device assembly, which is then secured to the frame structure 66.

The thermal exchange devices 70 can be secured to each other, and to the frame structure 66, by welding, mechanical fasteners, or by another attachment technique.

Figure 3:
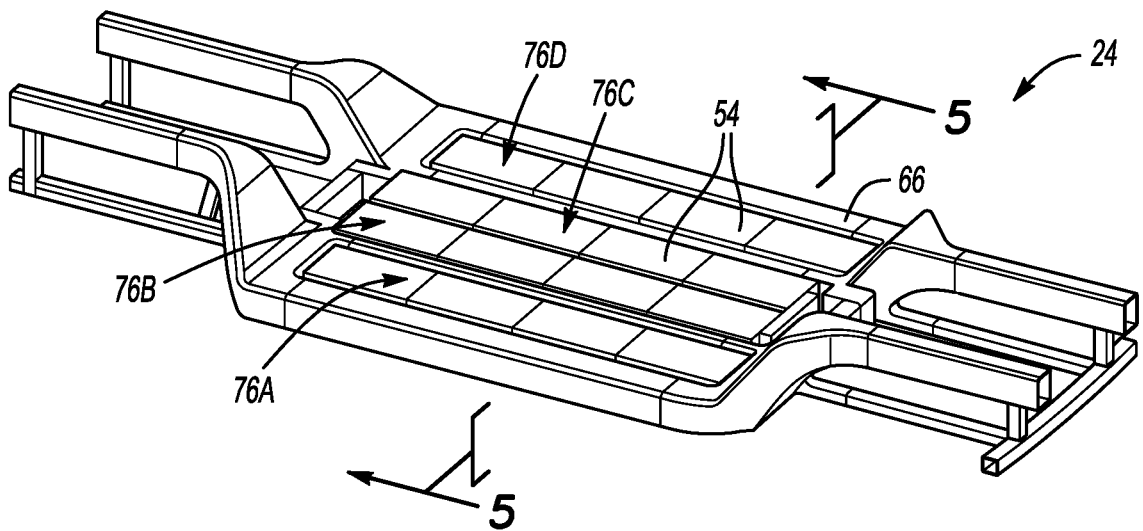
FIG. 3 shows a perspective view of the battery pack of FIG. 2.
Figure 4:
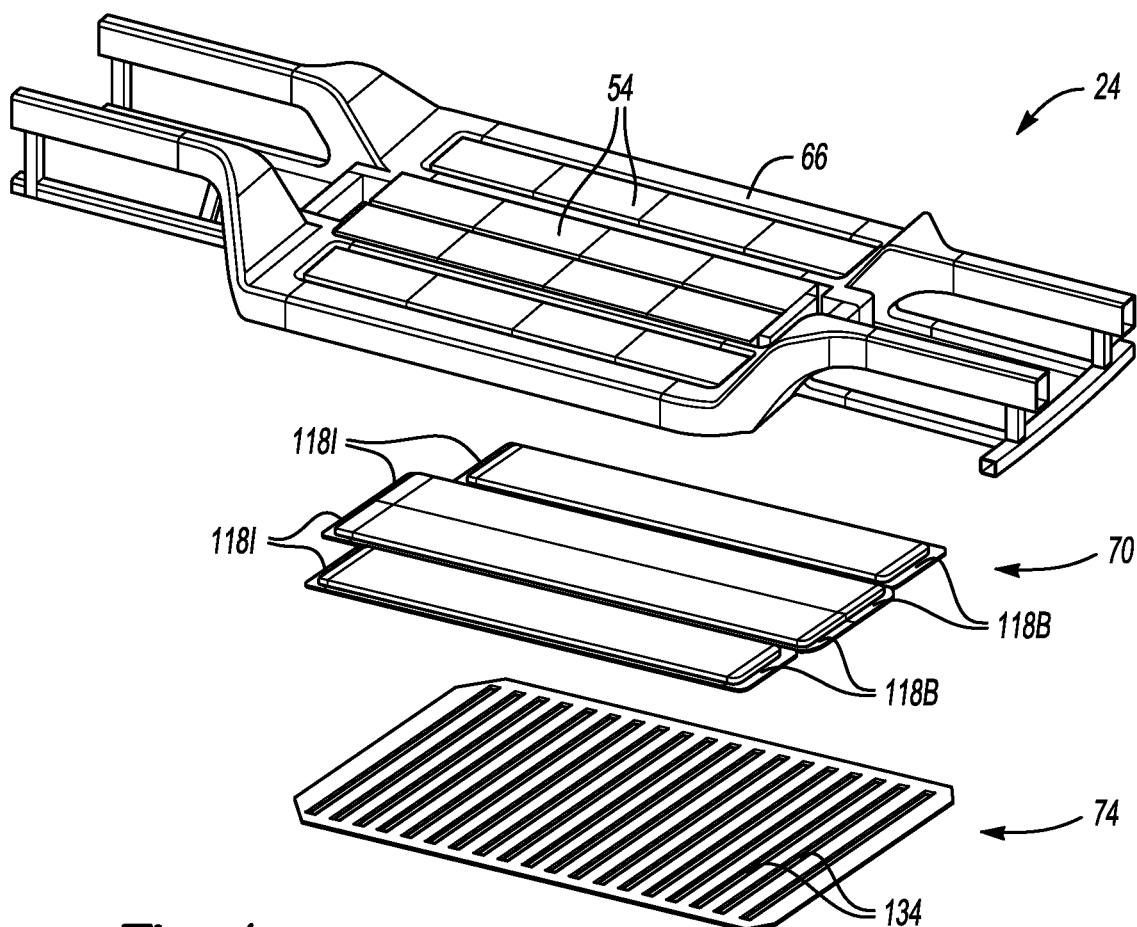
FIG. 4 shows an expanded perspective view of the battery pack of FIG. 3.

When the battery pack 24 is assembled as shown in FIGS. 3 and 5, the battery arrays 54 within the row 76A are positioned horizontally between the passenger side frame rail 86 and the inner rail 98 on the passenger side. Also, the battery arrays 54 within the rows 76B and 76D are positioned horizontally between the inner rails 98, and the battery arrays 54 within the row 76D are positioned horizontally between the driver side frame rail 94 and the inner rail 98 on the driver side.

When installed within the electrified vehicle 62, the battery arrays 54 are disposed on a first side 104 of the respective thermal exchange device 70. A thermal interface material (not shown) may be used at the interface between the battery arrays 54 and the first side 104 to facilitate thermal conductivity between the battery arrays 54 and the respective thermal exchange device 70. Also, thermal fins could be placed between individual battery cells of the battery arrays 54 to further facilitate thermal energy transfer.

The thermal exchange devices 70 include a plurality of liquid coolant channels 108. The thermal exchange devices 70 is considered a cold plate in some examples.

Figure 7:
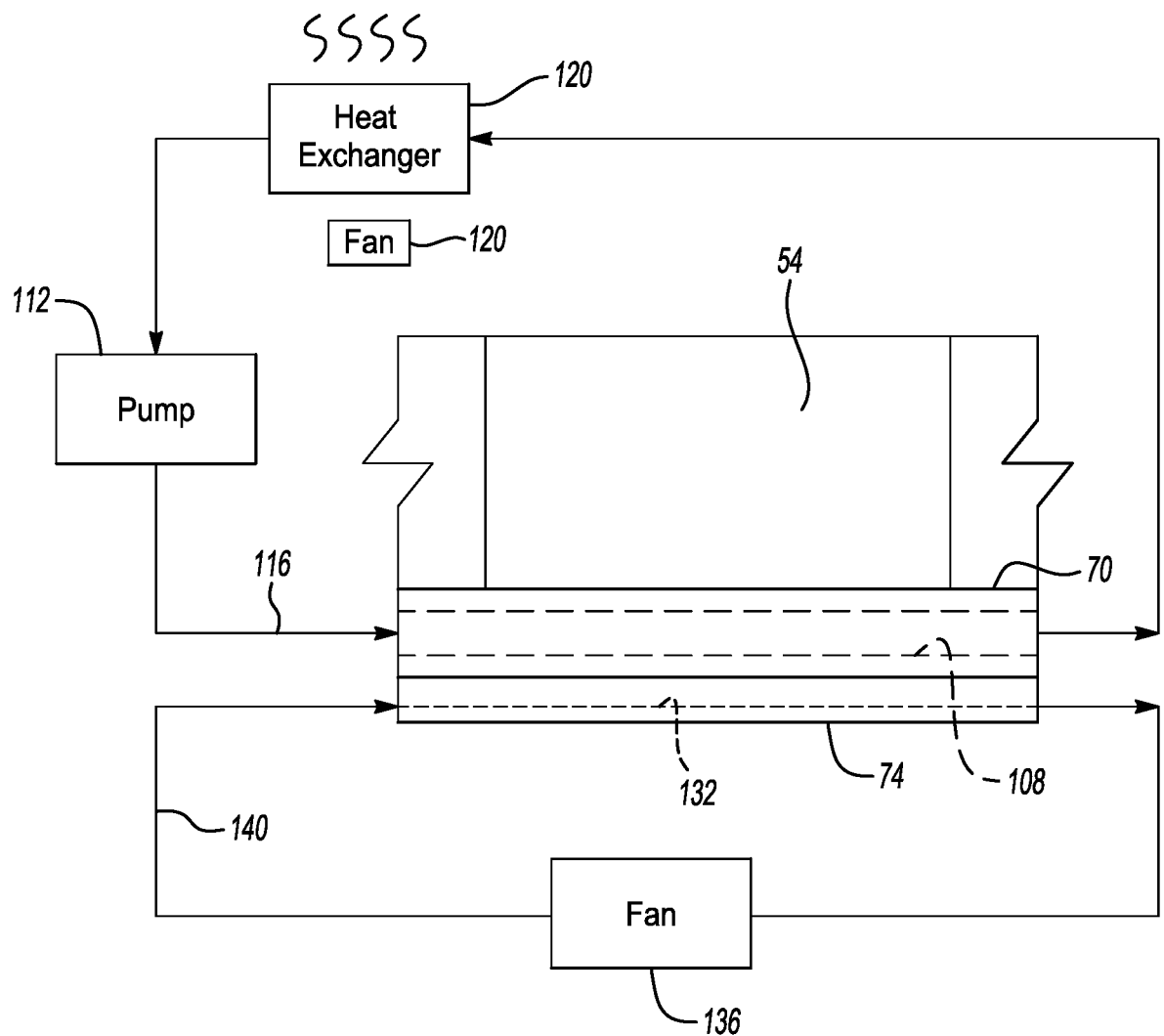
FIG. 7 shows a highly schematic view of a thermal management circuit used in connection with the battery pack of FIG. 2.

As shown schematically in FIG. 7, the electrified vehicle 62 can include a pump 112 that circulates a liquid coolant 116 through the liquid coolant channels 108 of the thermal exchange devices 70. In an example, the liquid coolant 116 circulating through the liquid coolant channels 108 can take on heat from the battery arrays 54. The thermal exchange devices 70 can each include an inlet manifold 118A that receives liquid coolant, which is then communicated to the liquid coolant channels 108. Liquid coolant that has passed through the liquid coolant channels 108 can be collected in outlet manifolds 118B of the thermal exchange devices 70.

Figure 2:
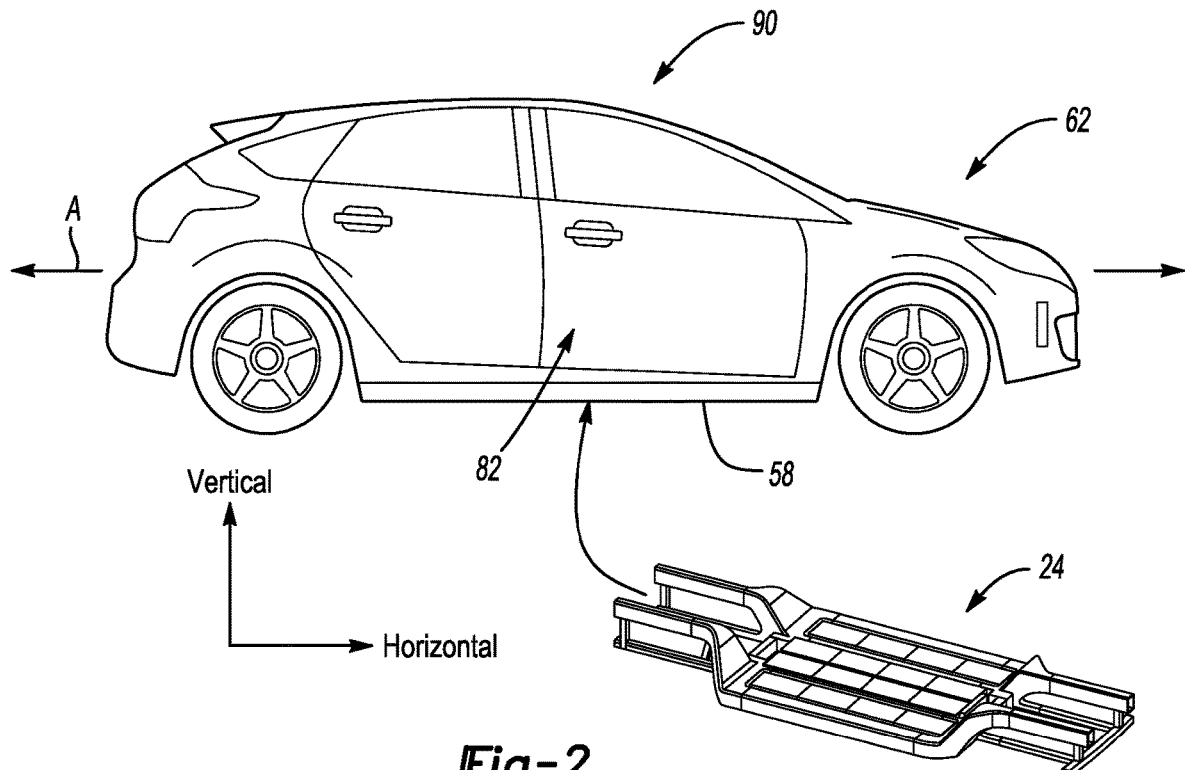
FIG. 2 shows a perspective view of how a battery pack is positioned within the electrified vehicle having the powertrain of FIG. 1.

Liquid coolant 116, which has been heated by the battery arrays 54, is then moved by the pump 112 to a heat exchanger 120 of the electrified vehicle 62 (FIG. 2). In some examples, the heat exchanger 120 is at a front end of the electrified vehicle 62. At the heat exchanger 120, heat is exchanged from the liquid coolant 116 to, for example, ambient air. A fan 122 can be used to move air through the heat exchanger 120. A liquid coolant 116 is cooled at the heat exchanger 120 and moved back to the thermal exchange devices 70 by the pump 112. In this example, the liquid coolant 116 is shown as used being used cool the battery arrays 54. In other examples, the liquid coolant 116 could be used to heat the battery arrays 54.

A plurality of fins 124 extend from an opposite, second side 128 of the thermal exchange devices 70. In this example, the fins 124 are formed together with portions of the respective thermal exchange device 70 as a monolithic structure. That is, the fins 124 are not formed separately from the respective thermal exchange device 70 and then attached to the second side 128. The fins 124 can be extruded together with the remaining portions of the second side 128. In another example, the fins 124 could be formed separately from the thermal exchange device 70 and then attached to the second side 128.

The thermal exchange device 70 can be an extruded aluminum, for example. A wall thickness of the thermal exchange device can be established based on, among other things, tooling constraints and load supporting requirements.

When the battery pack 24 is assembled, the skid plate 74 is disposed adjacent the plurality of fins 124 to establish a plurality of air coolant channels 132 between the second side 128 and the skid plate 74. Ribs 134 (FIG. 4) can be molded into the skid plate 74 to enhance a rigidity of the skid plate 74 and to, for example, prevent the skid plate 74 from bowing. The skid plate 74 can be secured using mechanical fasteners, for example.

The air coolant channels 132 essentially act as a plenum adjacent the second side 128 of the thermal exchange device 70. A fan 136 (FIG. 7) can be used to move a flow of air 140 through the air coolant channels 132.

When the liquid coolant 116 is utilized to cool the battery arrays 54, moving the air 140 through the air coolant channels 132 can enhance the cooling efficiency by assisting in thermal energy transfer from the liquid coolant 116, the thermal exchange devices 70, the battery arrays 54, or some combination of these. That is, thermal energy from the battery arrays 54 can pass through the thermal exchange devices 70 to the liquid coolant 116 and to air 140 within the air coolant channels 132.

In some examples, instead of, or in addition to air moved to the air coolant channels by the fan 136, ram air can be moved through the air coolant channels 132 as the electrified vehicle 62 is moving.

Further, when the electrified vehicle 62 is stationary, a controller of the electrified vehicle 62 can, in some examples, initiate operation of the fan 136 to move the air 140 through the air coolant channels 132. The fan 136 can move the air 140 through the air coolant channels 132 even if the liquid coolant 116 is not being actively circulated through the liquid coolant channels 108. Using the fan 136 to move the air 140 through the air coolant channels 132 in this way can be particularly beneficial during a fast-charge of the battery arrays 54 of the electrified vehicle 62 from an external power source. Fast-charging can generate relatively high amounts of thermal energy as is known.

Features of the disclosed examples include, among other things, a thermal exchange device assembly that provides a support structure to support a plurality of battery arrays without requiring a separate battery tray structure. This can reduce overall build complexity. Further, an overall mass of the support structure is reduced and volumetric density is improved. The thermal exchange device can communicate a liquid coolant that manages thermal energy. Further, air can move through channels at least partially provided by the thermal exchange plate to further manage thermal energy.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A battery assembly, comprising:
   at least one thermal exchange device having a plurality of liquid coolant channels, a first side that supports at least one battery array, and a second side;
   a plurality of fins extending from the second side; and
   a skid plate adjacent the plurality of fins to establish a plurality of air coolant channels between the second side and the skid plate.

2. The battery assembly of claim 1, wherein the at least one thermal exchange device is secured adjacent to an underside of an electrified vehicle.

3. The battery assembly of claim 1, wherein the at least one thermal exchange device provides a thermal exchange device assembly spanning from a driver side frame rail of a vehicle to a passenger side frame rail of the vehicle.

4. The battery assembly of claim 1, wherein the plurality of liquid coolant channels are configured to communicate a liquid coolant that exchanges thermal energy with the at least one battery array.

5. The battery assembly of claim 1, further comprising a fan configured to selectively move a flow of air through the air coolant channels.

6. The battery assembly of claim 1, wherein the first side is vertically above the second side.

7. The battery assembly of claim 1, wherein the plurality of liquid coolant channels are between the first and second sides.

8. The battery assembly of claim 1, further comprising the at least one battery array as a constituent of a traction battery pack.

9. The battery assembly of claim 1, wherein the plurality of fins and one of the at least one thermal exchange devices are formed together as a monolithic structure.

10. The battery assembly of claim 1, wherein the skid plate is a polymer based material.

11. The battery assembly of claim 1, wherein the at least one thermal exchange device comprises a first thermal exchange device having a lateral side portion secured directly to a lateral side portion of a second thermal exchange device.

12. The battery assembly of claim 1, wherein the first side is opposite the second side.

13. The battery assembly of claim 1, wherein each of the plurality of air coolant channels has a vertically uppermost side, and each of the liquid coolant channels has a vertically lowermost side that is vertically above the vertically uppermost sides of the plurality of liquid coolant channels.

14. The battery assembly of claim 1, wherein the plurality of liquid coolant channels are disposed vertically above the second side of the at least one thermal exchange device and vertically above the plurality of ribs.

15. The battery assembly of claim 9, wherein each of the air coolant channels within the plurality of air coolant channels has a circumferential perimeter defined entirely by the skid plate and the thermal exchange device.

16. The battery assembly of claim 1, wherein the plurality of fins are spaced a distance vertically from the plurality of liquid coolant channels such that the plurality of fins are vertically beneath the plurality of liquid coolant channels.

17. The battery assembly of claim 1, wherein the first side is vertically above the second side, wherein the second side is vertically above the plurality of fins such that the plurality of fins extend vertically downward from the second side.

18. The battery assembly of claim 1, wherein the plurality of air coolant channels are directly vertically beneath from the plurality of liquid coolant channels.

19. A battery assembly, comprising:
   at least one thermal exchange device having a first side that supports at least one battery array, a second side that is opposite the first side, a plurality of liquid coolant channels disposed vertically between the first and second sides, and a plurality of fins extending vertically downward away from the second side; and
   a skid plate adjacent the plurality of fins to establish a plurality of air coolant channels between the second side and the skid plate.

20. The battery assembly of claim 19, wherein the plurality of liquid coolant channels are disposed vertically above the second side of the at least one thermal exchange device and vertically above the plurality of fins.

* * * * *